United States Patent
Badihi

(10) Patent No.: US 11,303,357 B1
(45) Date of Patent: Apr. 12, 2022

(54) SYSTEMS, METHODS, AND DEVICES FOR OPTICAL ASSEMBLIES

(71) Applicant: MELLANOX TECHNOLOGIES TLV LTD., Raanana (IL)

(72) Inventor: Avner Badihi, Nataf (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 17/194,554

(22) Filed: Mar. 8, 2021

(51) Int. Cl.
*H04B 10/25* (2013.01)

(52) U.S. Cl.
CPC ................................. *H04B 10/25* (2013.01)

(58) Field of Classification Search
CPC .. H04B 10/25; H04B 10/0795; G02B 6/3586; G02B 6/3588
USPC .......................................................... 398/156
See application file for complete search history.

(56) References Cited

U.S. PATENT DOCUMENTS

| | | | | |
|---|---|---|---|---|
| 4,696,062 A * | 9/1987 | LaBudde | ................ | G02B 6/32 356/138 |
| 6,775,480 B1 * | 8/2004 | Goodwill | ............... | H04B 10/11 398/119 |
| 7,155,129 B2 * | 12/2006 | Bringans | ............... | H04B 10/801 398/131 |
| 8,200,094 B1 * | 6/2012 | Zhovnirovsky | ...... | H04B 10/803 398/129 |
| 9,142,938 B2 * | 9/2015 | Morris | ................... | H01S 5/4025 |
| 9,197,321 B2 * | 11/2015 | Tseng | ................. | H04B 10/0795 |
| 9,312,954 B2 * | 4/2016 | Chen | ................... | H04B 10/1143 |
| 2004/0165837 A1 * | 8/2004 | Cheung | ................ | G02B 6/4227 385/90 |
| 2006/0083144 A1 * | 4/2006 | Piede | .................... | G02F 1/3136 369/100 |

OTHER PUBLICATIONS

"Teramount website," Teramount Ltd., 2020, 6 pages [retrieved online from: www.teramount.com/#technology].

* cited by examiner

*Primary Examiner* — Dalzid E Singh
(74) *Attorney, Agent, or Firm* — Sheridan Ross P.C.

(57) ABSTRACT

An optical device includes a chip, a set of waveguides on the chip and configured to carry first optical signals modulated with data during a data transmission stage, and an alignment waveguide on the chip. The alignment waveguide is configured to receive a second optical signal during an alignment stage that aligns the set of waveguides with a collimator including a set of lenses. The alignment waveguide is configured to output the second optical signal from the chip. The second optical signal output from the chip is indicative of a quality of alignment between the set of waveguides and the collimator.

20 Claims, 10 Drawing Sheets

SYSTEMS, METHODS, AND DEVICES FOR OPTICAL ASSEMBLIES

FIELD OF THE DISCLOSURE

The present disclosure is generally directed to systems, methods, and devices for optical assemblies.

BACKGROUND

Waveguides are employed in data transmission systems to achieve high-speed transmission. One factor that impacts performance of these systems is the quality of alignment between waveguides on a chip that generates and/or processes optical signals and waveguides that carry the optical signals to and/or from a destination/source device.

BRIEF SUMMARY

In an illustrative embodiment, an optical device includes a chip, a set of waveguides on the chip and configured to carry first optical signals modulated with data during a data transmission stage, and an alignment waveguide on the chip. The alignment waveguide is configured to receive a second optical signal during an alignment stage that aligns the set of waveguides with a collimator including a set of lenses, and output the second optical signal from the chip. The second optical signal output from the chip is indicative of a quality of alignment between the set of waveguides and the collimator.

In an illustrative embodiment, a system includes a chip including a set of waveguides and an alignment waveguide and a first collimator including a set of lenses configured to pass first optical signals to or from the set of waveguides, a first lens configured to pass a second optical signal to a first end of the alignment waveguide, and a second lens configured to pass the second optical signal received from a second end of the alignment waveguide. The system includes a second collimator including a first channel configured to pass the second optical signal to the first end of the alignment waveguide through the first lens of the first collimator, and a second channel configured to pass light received through the second lens of the first collimator to a detector. The system includes a mechanism configured to move either the chip or the first collimator and the second collimator to align central axes of the set of waveguides with optical axes of the set of lenses based on light detected by the detector.

In an illustrative embodiment, a method includes generating, by an external source, an optical signal, passing the optical signal through a first channel of a first collimator, passing, by a second collimator, the optical signal received from the first channel to a first waveguide on a chip, passing, by the first waveguide, the optical signal received from the second collimator to a second channel of the first collimator, detecting the optical signal received from the second channel, and moving either the chip or the first collimator and the second collimator based on the detected optical signal to align a set of waveguides, including the first waveguide, on the chip with the second collimator.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
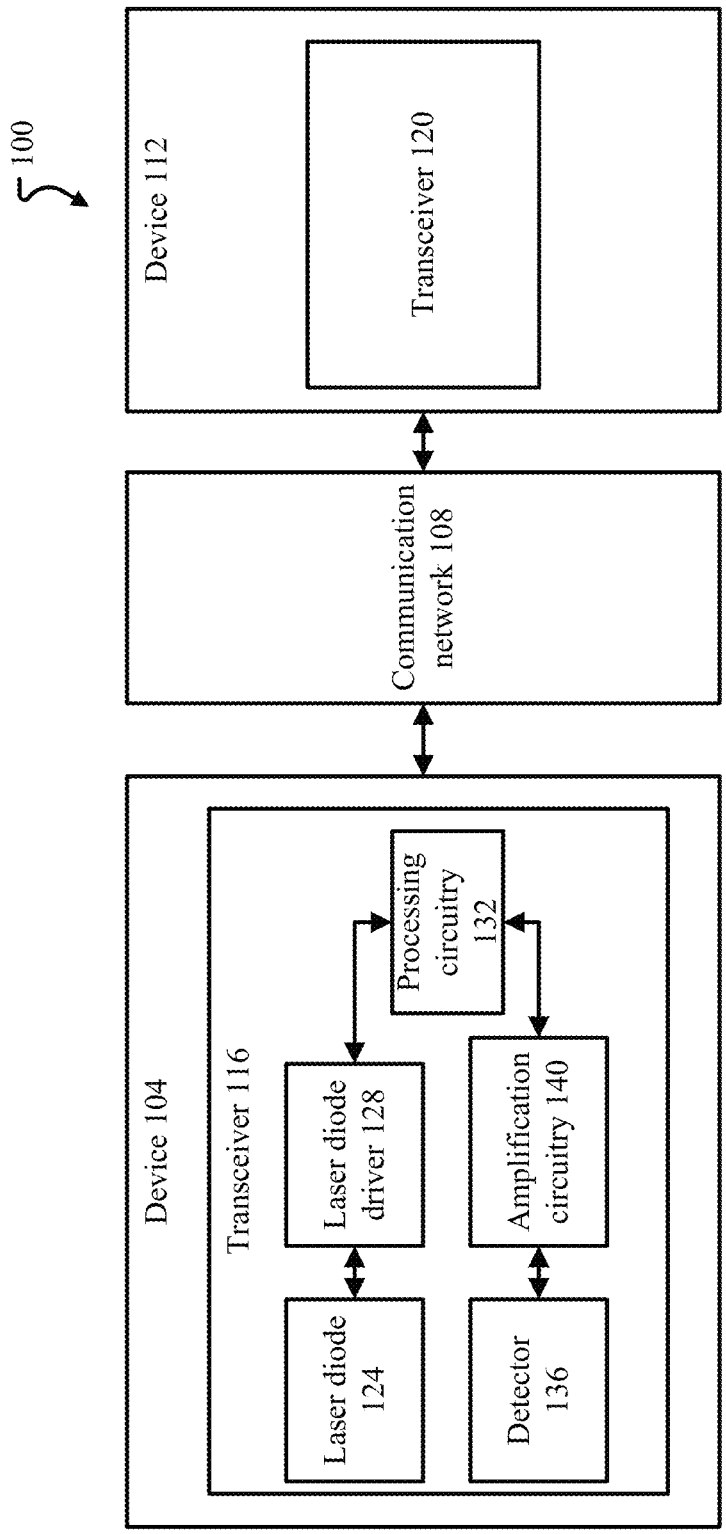
FIG. 1 illustrates an optical system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts relate to a micro-optical element (a first collimator) having an array of micro lenses and mirror(s) that can be aligned to a set of Single Mode waveguides spaced at regular intervals on a semiconductor substrate or silicon photonics (SiP) chip to provide coupling of the waveguide input/output on the SiP chip and to convert the optical beam to a collimated light beam or an array of collimated light beams incident to or output from the SiP chip trough the micro-optical element.

The micro-optical element may be adhered directly on the surface SiP chip. The assembly optically couples the lens/ lenses accurately to the ends of the waveguides with a low insertion loss and provides a path between the collimated light beams and the waveguides on the surface of the SiP chip.

In general, a collimated light beam is provided by a second collimator that collimates the light beam from a Single Mode Fiber (SMF). The SiP chip has a "feedback loop," which may be implemented as a "U" shaped waveguide with an end that can be coupled to an input light beam and an end that can output the light beam. The second collimator includes a first channel optically coupled to a light source that emits a collimated light beam. The same second collimator has a second channel connected to a light detector that receives the fed back version of the collimated light beam from the output end of the feedback waveguide.

During an alignment process, the first collimator is placed in a fixed position in relation to the second collimator within 3 um to 5 um accuracy. Then, the SiP chip is brought to coarse alignment with the first collimator by mechanical passive placement of the chip relative to the first collimator at 2 um to 3 um accuracy. To carry out alignment, the collimated laser beam from the first channel of the second collimator couples to one designated lens of the first collimator, which is coupled to the feedback loop on the chip. The detector receives the collimated light beam passed through the feedback loop from a second designated lens of the first collimator and the second channel of the second collimator. In at least one example embodiment, the first and second collimators are held by a fixture and the SiP chip is held and moved by a chip holder. Inventive concepts may be said to carry out a semi-active alignment where the SiP chip is aligned with the first collimator based on the maximization of the light going through the feedback loop. Notably, the SiP chip does not need to be powered itself. After alignment, the SiP chip and the first collimator may be bonded to one another by a transparent adhesive between the SiP chip and the first collimator. The curing of the adhesive may be UV or catalytic curing depending on the type of adhesive.

In general, inventive concepts relate to a system to couple the SiP chip to a collimator. The collimator may be a passive block formed of silicon or other suitable material that redirects horizontal diverging light beams emitted to or from the SiP chip front surface into vertical collimated light beams. The collimator includes collimating/focusing lenses on one side, a 45° mirror or other optical element on an opposite side, as well as an etched portion that allows the SiP chip to be set in place. The bottom part of the SiP chip may include alignment marks to carry out an initial "coarse" alignment between the SiP chip and the collimator prior to a short active alignment that will bring the parts into optical alignment. The initial coarse alignment will bring the SiP chip into a proximity location of around 1 µm to 2 µm from the optimal coupling point of the collimator.

After the coarse alignment, the system activates the alignment process that sends light into an end of the waveguide loop on the SiP chip and outputs light from the other end of the waveguide loop. The location of the z-axis coupling point may be set by this process. By monitoring the feedback loop and making the necessary adjustments in six axes including X, Y, and Z axes and the three angular axes, an optimal or improved coupling between the SiP chip and the collimator is achieved.

Example embodiments are directed to a system for aligning a collimator including lenses with a chip having waveguides that correspond to the lenses. The chip includes a dedicated alignment waveguide to carry out the alignment, where the alignment waveguide serves as a feedback loop for an external optical signal. During an alignment process, the alignment waveguide receives the external optical signal through the collimator and feeds the external optical back to a detector through the same collimator. The fed back version of the optical signal detected by the detector is indicative of an amount of alignment between the collimator and chip, and a mechanism moves the chip (or the collimator) to maximize at least one property of the optical signal detected by the detector. The chip and the collimator are considered aligned when the at least one property is maximized or reaches an acceptable value.

FIG. 1 illustrates an optical system 100 according to at least one example embodiment. The optical system 100 includes a device 104, a communication network 108, and a device 112. In at least one example embodiment, devices 104 and 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. As another specific but non-limiting example, the devices 104 and 112 may correspond to servers offering information resources, services and/or applications to user devices, client devices, or other hosts in the system 100.

Examples of the communication network 108 that may be used to connect the devices 104 and 112 include an Internet Protocol (IP) network, an Ethernet network, an InfiniBand (TB) network, a Fibre Channel network, the Internet, a cellular communication network, a wireless communication network, combinations thereof (E.g., Fibre Channel over Ethernet), variants thereof, and/or the like. In one specific, but non-limiting example, the communication network 108 is a network that enables data transmission between the devices 104 and 112 using optical signals. In this case, the devices 104 and 112 and the communication network 108 may include waveguides (e.g., optical fibers) that carry the optical signals. As discussed in more detail below, example embodiments relate to aligning the waveguides of the devices 104 and 112 with respective collimators to enable communication over the communication network 108.

The device 104 includes a transceiver 116 for sending and receiving optical signals. The optical signals may be modulated with data. In at least one example embodiment, a silicon photonics (SiP) chip may include all or some of the elements of the transceiver 116. As discussed in more detail below, the SiP chip may include waveguides that carry the optical signals, and the waveguides should be accurately aligned with a collimator so that light passing through a waveguide also passes through a corresponding lens of the collimator.

The device 112 may include a transceiver 120 for sending and receiving optical signals modulated with data. The same or similar structure of the transceiver 116 may be applied to transceiver 120, and thus, the structure of transceiver 120 is not described separately.

Still with reference to FIG. 1, the transceiver 116 includes a light emitting portion or light source for generating optical signals, such as a diode laser 124. The diode laser 124 may be a single diode laser or an array of diode lasers depending on design preferences. The transceiver 116 further includes a driver for the light emitting portions, such as diode laser driver 128, which may include appropriate driving circuitry for causing the diode laser 124 to emit light (e.g., modulated light) under control of the processing circuitry 132. Alternatively, the diode laser 124 may emit a continuous not varying light output, and the light modulation will be carried by an optical element on the SiP Chip such as a Mach-Zender modulator, a Frankc-Keldish modulator, or a microring modulator. The transceiver 116 may further include processing circuitry 132, amplification circuitry 140, and detector 136. Here, it should be appreciated that the diode laser 124 and diode laser driver 128 are elements associated with transmission capabilities of the transceiver 116, while the detector 136 and the amplification circuitry 140 are elements associated with receive capabilities of the transceiver 116.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control overall operation of the transceiver 116.

The detector 136 may comprise an optical detector for detecting optical signal. For example, the detector 136 may include one or more photodiodes or other photosensor(s) (e.g., phototransistors, avalanche photodiodes, and/or the like) for converting incident light into electrical signals. In at least one example embodiment, the detector 136 may comprise a plurality of photosensors in an array, where each photosensor is associated with a pixel in the array.

The amplification circuitry 140 may comprise circuitry for amplifying the electrical signals output from the detector 136 to ensure the processing circuitry 132 receives the electrical signals with sufficient amplitude. A specific, but non-limiting, example of the amplification circuitry 140 is one or more transimpedance amplifiers (TIAs). Additionally or alternatively, other suitable amplification circuitry generally known in the art may also be employed.

Although not explicitly shown, it should be appreciated that devices 104 and 112 may include other processing devices, storage devices, and/or communication interfaces generally associated with computing tasks, such as sending and receiving data.

Figure 2:
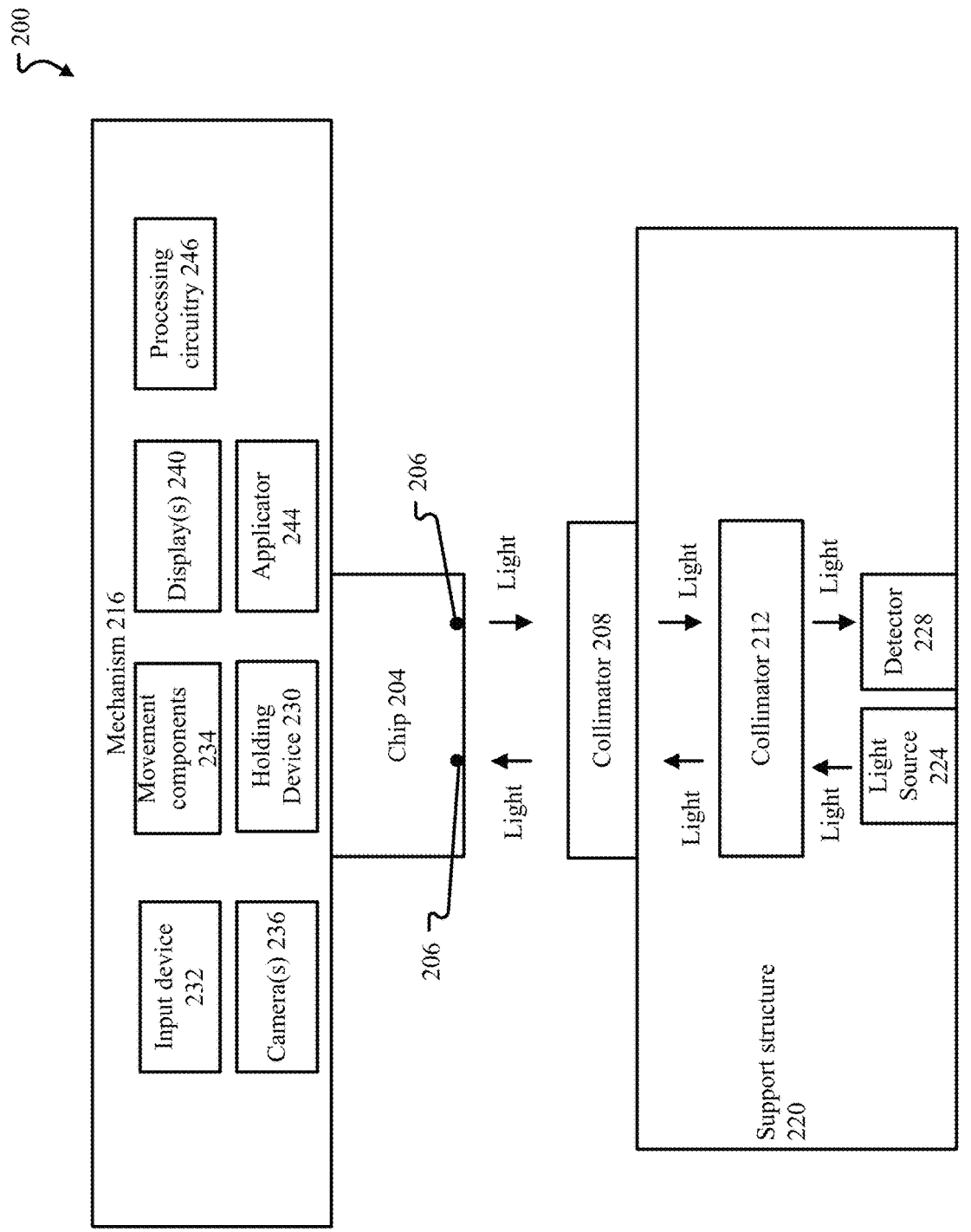
FIG. 2 is a block diagram illustrating an alignment system according to at least one example embodiment.

FIG. 2 is a block diagram illustrating an alignment system 200 according to at least one example embodiment. The system 200 includes a chip 204, a first collimator 208, a second collimator 212, an alignment mechanism (or mechanism) 216, a support structure 220, a light source 224, and a detector 228. The system 200 is for aligning the chip 204 with the collimator 208 and adhering the two elements together once in alignment. The chip 204 may correspond to the SiP chip mentioned above, and although not explicitly illustrated, the chip 204 may include one or more elements of the transceiver 116. The chip 204 may further include waveguides fixed to one surface of the chip 204. One of the waveguides may be an alignment waveguide 206 that is used during the alignment stage or process that aligns the chip 204 with the collimator 208. The chip 204 may be comprised of silicon or other suitable substrate material.

The collimator 208 may include a plurality of lenses positioned in a lens block. When the collimator 208 and the chip 204 are assembled, each lens may pass light to and/or from a corresponding waveguide on the chip 204. The collimator 208 is fixed to the chip 204 during an alignment process.

The collimator 212 may correspond to the second collimator mentioned above and also include a plurality of lenses to pass light to and/or from collimator 208. The collimator 212 may further include waveguides that carry optical signals between the collimator 208 and the light source 224 and detector 228. The collimator 212 may be wholly or partly housed in the support structure 200. For example, the support structure 220 may include a hollow cavity that holds the collimator 212 in place (see FIGS. 6B and 6C).

The mechanism 216 includes suitable hardware and/or software and sub-mechanisms for accomplishing alignment between the chip 204 and the collimator 208. For example, the mechanism 216 may include holding device 230 to detachably hold the chip 204. The holding device 230 may include a vacuum device, clamp, or other suitable component for holding the chip 204 above the support structure 220 and releasing the chip 204 when ready.

The mechanism 216 may be controlled automatically, manually, or a combination thereof. Automatic control may include the processing circuitry 246 or other computing device of the mechanism 216 executing pre-programmed instructions to move in a particular manner to align the chip 204 with the collimator 208. Manual control may include an operator inputting control signals to the mechanism 216 via an input device 232, such as a keyboard, mouse, joystick, buttons, and/or the like. The mechanism 216 may send and/or receive signals regarding a quality of the alignment between the chip 204 and the collimator 208. For example, the mechanism 216 may be in wired and/or wireless communication with the support structure 220 in order to gather information during an alignment process. In at least one example embodiment, such information may include at least one property about the signal emitted by the light source 224 and/or the signal detected by the detector 228. Such signal properties may include signal power, power density, coherence, wavelength, spatial profile, temporal profile, and/or the like. The mechanism 216 and/or the operator may use the signal information to assist with aligning the chip 204 with the collimator 208.

The mechanism 216 may further include movement components 234 that enable the mechanism 216 or the holding device 230 that holds the chip 204 to move in all directions (e.g., x, y, and z directions and three angular directions). The movement components 234 may include any suitable mechanical components, electromechanical components, electrical components, and controls that enable movement in all directions.

In at least one example embodiment, the mechanism 216 includes one or more cameras 236 that provide moving and/or still images of the alignment process (e.g., close-up views of the chip 204 and collimator 208), and one or more displays 240 that display these moving and/or still images to the operator.

The mechanism 216 may include additional components suitable for adhering or otherwise fixing the chip 204 to the collimator 208 once proper alignment is achieved. For example, the mechanism 216 includes a movable applicator 244 for applying adhesive to the chip 204 and/or the collimator 208. In the event that the adhesive needs curing (e.g., UV curing or heat/infrared (IR) curing), the mechanism 216 may further include a device for curing (e.g., a UV light source or heat/IR source).

Although the input device 232, camera 236, display 240, and applicator 244 are shown as being included in the mechanism 216, it should be appreciated that one or more of these elements may be embodied in a device or devices separate from but in wired and/or wireless communication with the mechanism 216.

The support structure 220 supports the collimator 208 and holds the collimator 208 in place with, for example, a clamp, a recess fitted for the collimator 208, a vacuum holder, or other suitable mechanism for detachably fixing the collimator 208 to the support structure 220 during the alignment process. The support structure 220 may further include the collimator 212, light source 224, and/or detector 228. FIGS. 6B and 6C illustrate an example of the support structure 220 in more detail. In any event, the support structure 220 helps align the collimator 208 with the collimator 212 within about 3 um to 5 um. Said another way, each lens of the collimator 208 is aligned within 3 um to 5 um of a corresponding lens of the collimator 212.

The light source 224 may emit light used during the alignment process. In at least one example embodiment, the light source 224 comprises one or more diode lasers or other laser(s) that emit collimated light. The detector 228 detects light returned from the chip 204 through the collimators 208 and 212. The detector 228 may include one or more photoelectric conversion regions (e.g., photodiodes) that convert received light into electric charge. The detector 228 may include processing circuitry for monitoring at least one property of the detected light.

The processing circuitry 246 may include any suitable software and/or hardware for controlling the mechanism 216 and/or other elements of the system 200. The processing circuitry 246 may be implemented in the same or similar manner as processing circuitry 132. The processing circuitry 246 may be in wired or wireless communication with the light source 224, the detector 228, and/or other unillustrated elements of the system 200. The processing circuitry 246 may monitor at least one property of light detected by the detector 228 (or receive information indicative of the at least one property), and operate the mechanism 216 responsive to the at least one property of detected light to move the chip 204 in alignment with the collimator 208 and adhere the chip 204 and the collimator 208 together.

During an alignment stage or process, the chip 204 and the collimator 208 are brought into coarse alignment (e.g., within 1 um to 10 um) by the mechanism 216. The bottom of the chip 204 and/or the top of the collimator 208 may include one or more alignment marks or fiducials to assist with bringing the chip 204 and the collimator 208 into coarse alignment. A finer alignment process occurs after the coarse alignment process. During the fine alignment process, the light source 224 is controlled to emit light, which travels through the collimators 212 and 208 into the alignment 206 waveguide on the chip 204. The alignment waveguide 206 acts as a feedback mechanism by outputting the light received from the collimators 212 and 208 back through the collimators 208 and 212 to the detector 228. One or more properties of the light detected by the detector 228 are examined to determine the quality of alignment between the chip 204 and the collimator 208, and the mechanism 216 is controlled to move the chip 204 relative to the collimator 208 until the one or more properties of the light detected by the detector 228 are maximized (or close to maximized) or optimized (or close optimized) compared to the light output by the light source 224. In other words, the light received by the alignment waveguide 206 and fed back to the detector 228 is indicative of a quality of alignment between the set of waveguides 248 and the collimator 208 because the one or more properties of light monitored at the detector 228 change depending on how much light is fed back from the alignment waveguide 206 to the detector 228 compared to light output from the source 224. For example, if the system 200 (e.g., the processing circuitry 246) is monitoring signal intensity of the optical signal fed back through the alignment waveguide 206, then decreased signal intensity compared to the signal output from the source 224 may indicate poorer quality alignment while increased signal intensity may indicate a higher quality alignment.

Upon achieving a desired value or values for the one or more properties of light, the chip 204 is fixed to the collimator 208 with an adhesive or other suitable fixing material. The above-described alignment process may bring each waveguide on the chip 204 within 0.1 um of a corresponding lens of the collimator 208.

Figure 3A:
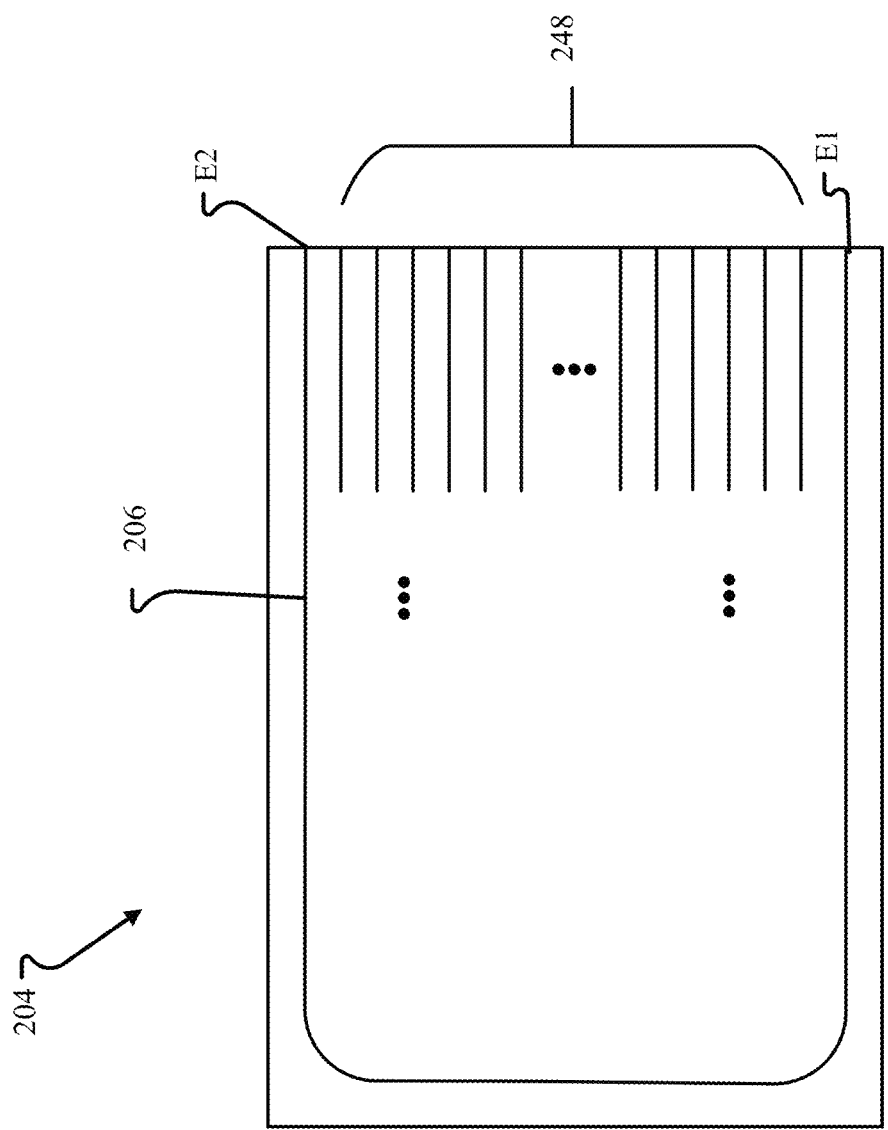
FIGS. 3A and 3B illustrate details for a portion of the system in FIG. 2 according to at least one example embodiment.
Figure 3B:
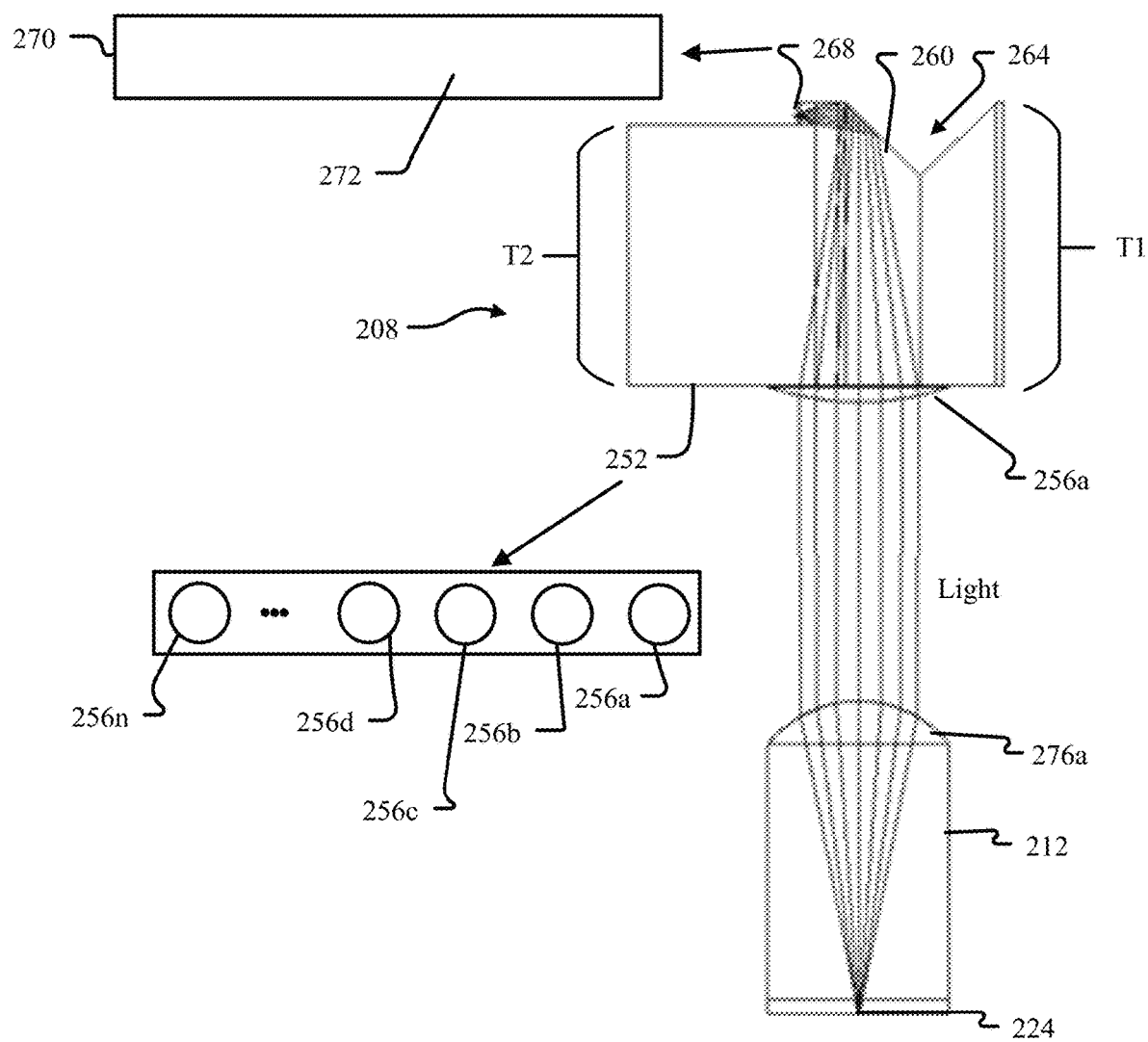

FIGS. 3A and 3B illustrate details for a portion of the system 200 in FIG. 2 according to at least one example embodiment.

In particular, FIG. 3A illustrates a bottom plan view of the chip 204 and FIG. 3B is a schematic representation illustrating views of the collimator 208 and the collimator 212. As shown, the alignment waveguide 206 and a set of waveguides 248 are fixed to the bottom of the chip 204. A number of the set of waveguides 248 may vary according to design preferences. In at least one example embodiment, the set of waveguides 248 includes 50 waveguides arranged at regular intervals on the chip 204. Although not explicitly shown, the ellipses indicate that the set of waveguides 248 may extend further than illustrated. For example, the set of waveguides 248 may be arranged to correspond to a respective detector or light source on the chip 204. The set of waveguides 248 on the chip 204 may be configured to carry first optical signals modulated with data during a data transmission stage that occurs after an alignment stage in which the chip 204 and the collimator 208 are aligned.

On the other hand, the alignment waveguide 206 is configured to receive a second optical signal during an alignment stage that aligns the set of waveguides 248 with the collimator 208. The alignment waveguide 206 is configured to output the second optical signal from the chip 204. The second optical signal may be modulated with data, if desired, but such modulation is not necessary. As explained herein, the second optical signal output from the chip 204 is indicative of a quality of alignment between the set of waveguides 248 and the collimator 208. The goal is to align the chip 204 with the collimator 208 so that central or center axes of the set of waveguides 248 are aligned with optical axes of the set of lenses 256, thereby ensuring high efficiency transmission or receipt of the optical signals modulated with data during the data transmission stage.

As in FIG. 3B, the alignment waveguide 206 may have a U-shaped structure and extend around an outer region of the chip 204 from one end of the chip 204 to an opposite end of the chip 204. However, the alignment waveguide 206 may have any suitable shape and/or arrangement on the chip 204 relative to waveguides 248 so long as one end E1 of the alignment waveguide 206 is able to receive an optical signal from the collimator 208 and the other end E2 of the alignment waveguide 206 is able to output the optical signal to the collimator 208 during an alignment stage or process in which the collimator 208 is aligned with waveguides 248 of the chip 204.

At least some of the input/output ends of the set of waveguides 248 are arranged between the first end E1 of the alignment waveguide 206 and the second end E2 of the alignment waveguide 206. For example, the first end E1 of the alignment waveguide 206 and the second end E2 of the alignment waveguide 206 are closer to respective opposite edges of the chip 204 than the majority of the set of waveguides 248. In the example of FIG. 3A, all of the input/output ends of the waveguides 248 are arranged between the first and second ends E1 and E2 of the alignment waveguide 206. However, example embodiments are not limited thereto and one or more waveguides 248 may be located between an end E1 and/or E2 and a respective edge of the chip 204.

Still with reference to FIGS. 3A and 3B, the collimator 208 includes a surface 252. The surface 252 may include a set of lenses 256a to 256n arranged thereon. Each lens 256 is arranged on or in the collimator 208 to pass light to and/or from an input/output end of waveguides 206 and 248 on the chip 204. FIG. 3B illustrates an example where the lenses 256a to 256n are on the surface 252, but the lenses 256a to 256n may also be partially or wholly embedded into the surface 252. A first lens 256a is configured to pass the second optical signal to a first end E1 of the alignment waveguide 206. A second lens 256n is configured to pass the second optical signal output from a second end E2 of the alignment waveguide 206. As noted above, the second optical signal is generated by a source 224 external to the chip 204 and the collimator 208. Although FIG. 3B illustrates a single row of lenses on the collimator 208, it should be appreciated that more rows of lenses may exist to create an array of lenses in columns and rows.

The collimator 208 includes at least one optical element 260 configured to reflect the first optical signals at a location between the set of lenses 256a to 256n and the set of waveguides 248. The at least one optical element 260 also reflects the second optical signal at a location between the first and second lenses 256a and 256n and the first and second ends of the alignment waveguide 206. The at least one optical element 260 may include a mirror, a prism, or other element for redirecting or reflecting light at a desired angle (e.g., 90 degrees).

As shown in FIG. 3B, a surface of the collimator 208 includes a groove 264 with an exposed outer wall and a concealed inner wall (e.g., concealed from an exterior environment by other walls of the collimator 208). The at least one optical element 260 is on the inner wall of the groove 264. In the example of FIG. 3B, the groove 264 extends from a first edge of the collimator 208 to a second edge of the collimator 208. The at least one optical element 260 may be a single optical element on the inner wall of the groove 264 that spans from or near the first edge of the collimator to or near the second edge of the collimator 208. Alternatively, the at least one optical element 260 includes multiple optical elements, for example, a respective optical element 260 for each lens 256 and corresponding waveguide 248. In at least one example embodiment, the groove 264 does not extend across the entire collimator 208 and instead may extend from just beyond the lens 256a to just beyond the lens 256n.

Figure 4:
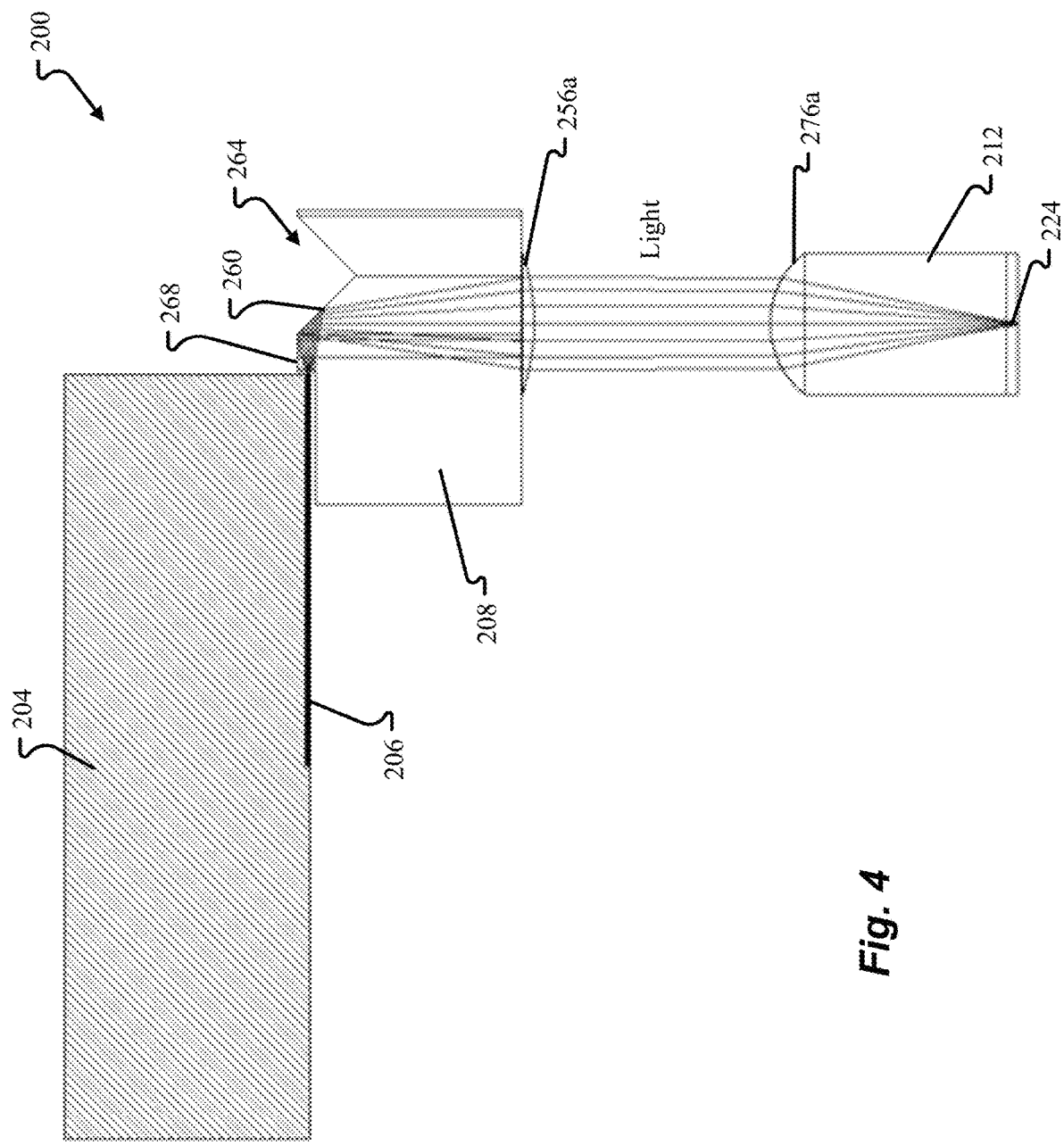
FIG. 4 illustrates a view of the collimator mounted to or in the process of being mounted to a chip according to at least one example embodiment.

As further shown, the collimator 208 includes a step portion 268 that may function as a stopper for the chip 204 (but the step portion 628 does not necessarily contact the chip 204 in the finally aligned product) when mounting the chip 204 to the collimator 208 (see FIG. 4). The step portion 268 creates a wall 270 between a first portion of the collimator 208 with a first thickness T1 and a second portion of the collimator 208 with a second thickness T2 less than the first thickness T1. The wall 270 forms a substantially right angle or some other suitable angle (e.g., an acute angle) with a surface of the collimator 208. The first optical signals and the second optical signals pass through a face 272 of the wall 270 of the step portion 268. The face 272 may comprise a material that is transparent to light. For example, the face 272 may include one or more anti-reflective coatings to reduce Fresnel reflections from the wall surface and further improve the unobstructed passage of the light through the wall 270.

The collimator 212 includes a set of lenses that correspond to the set of lenses 256a to 256n. A single lens 276a is shown, but it should be appreciated that the collimator 212 may include a same number of lenses in a same or similar arrangement as the collimator 208. Alternatively, the collimator 212 includes fewer lenses, for example, only two lenses—the lens 276a and a second lens (e.g., 276n in FIG. 5B) that corresponds to lens 256n.

In operation, the at least one optical element 260 is configured to reflect the first optical signals received through the face 272 of the wall 270 from the set of waveguides 248 toward the set of lenses 256a to 256n, and to reflect the first optical signals received from the set of lenses 256a to 256n toward the set of waveguides 248 through the face 272 of the wall 270. Still further, the at least one optical element 260 is configured to reflect the second optical received through the first lens 256a toward the first end E1 of the alignment waveguide 206 through the face 272 of the wall 270, and to reflect the second optical signal received from the second end E2 of the alignment waveguide 206 through the face 272 of the wall 270 toward the second lens 256n.

Although not explicitly shown, the chip 204, the collimator 208, or both have one or more alignment marks or fiducials to assist with bringing the chip 204 into coarse alignment with the collimator 208. The one or more alignment marks may be arranged in any suitable location on the chip 204 and/or the collimator 208, for example, on a top surface of the chip 204, on a surface of the collimator 208 opposite the surface 252, on the step portion 268, and/or other suitable location.

FIG. 4 illustrates a side cross-sectional view of the collimator 208 mounted to or in the process of being mounted to the chip 204 according to at least one example embodiment. The step portion 268 may serve as a stopper for the chip 204. However, the chip 204 does not necessarily contact the step portion 268 in the final alignment. In other words, the chip 204 may be slightly spaced apart from the step portion 268 in the final aligned product. The chip 204 may be mounted to the collimator 208 via an adhesive between one or more portions of the chip 204 and the collimator 208 that face or contact one another.

Figure 5B:
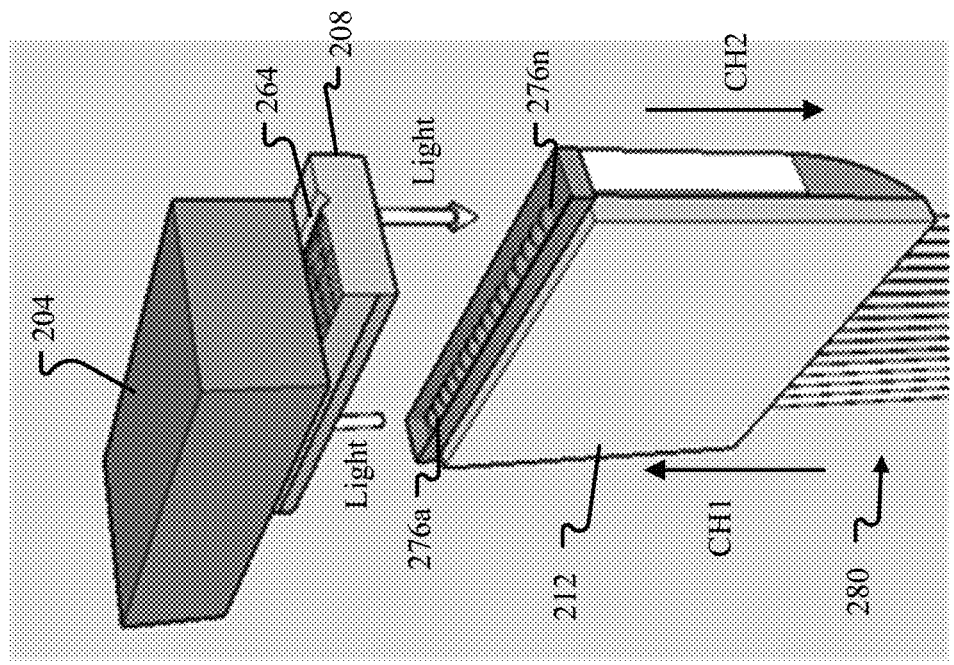
FIGS. 5A and 5B illustrate perspective views of elements in the system of FIG. 2 according to at least one example embodiment.
Figure 5A:
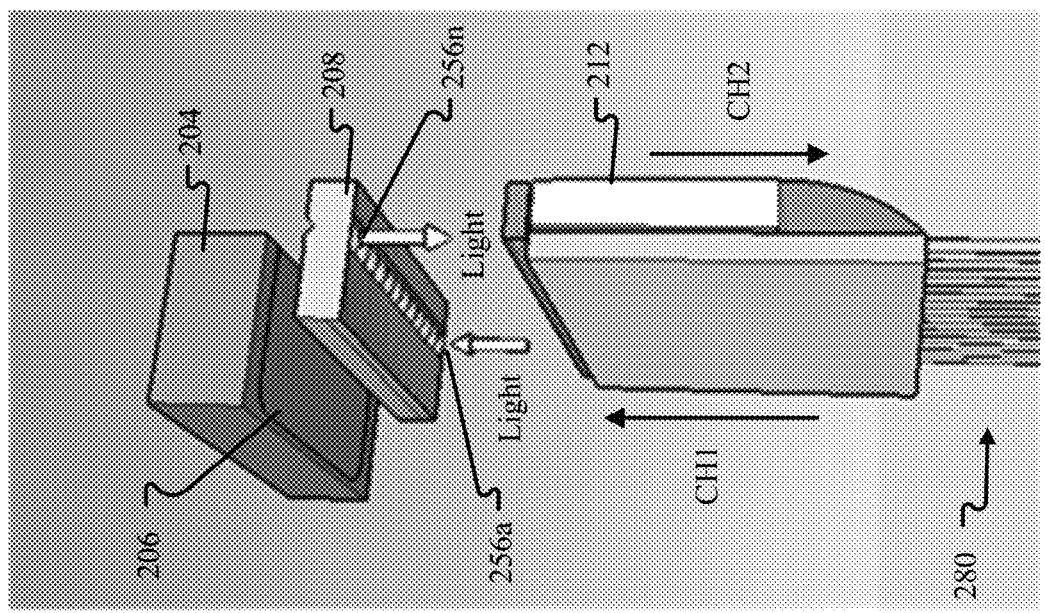

FIGS. 5A and 5B illustrate perspective views of elements in the system 200 of FIG. 2 according to at least one example embodiment. As shown, the collimator 212 includes a first channel CH1 configured to pass the second optical signal (i.e., the signal used for alignment) to the first end E1 of the alignment waveguide 206 through the lenses 276a and 256a (waveguides 248 not illustrated in FIGS. 5A and 5B. The collimator 212 further includes a second channel CH2 configured to pass light received through the second lens of the first collimator to the detector 228. The first channel CH1 may include a first one of the waveguides 280 while the second channel CH2 may include a second one of the waveguides 280. The first one of the waveguides 280 may be aligned with the source 224 while the second one of the waveguides 280 may be aligned with the detector 228.

Figure 6A:
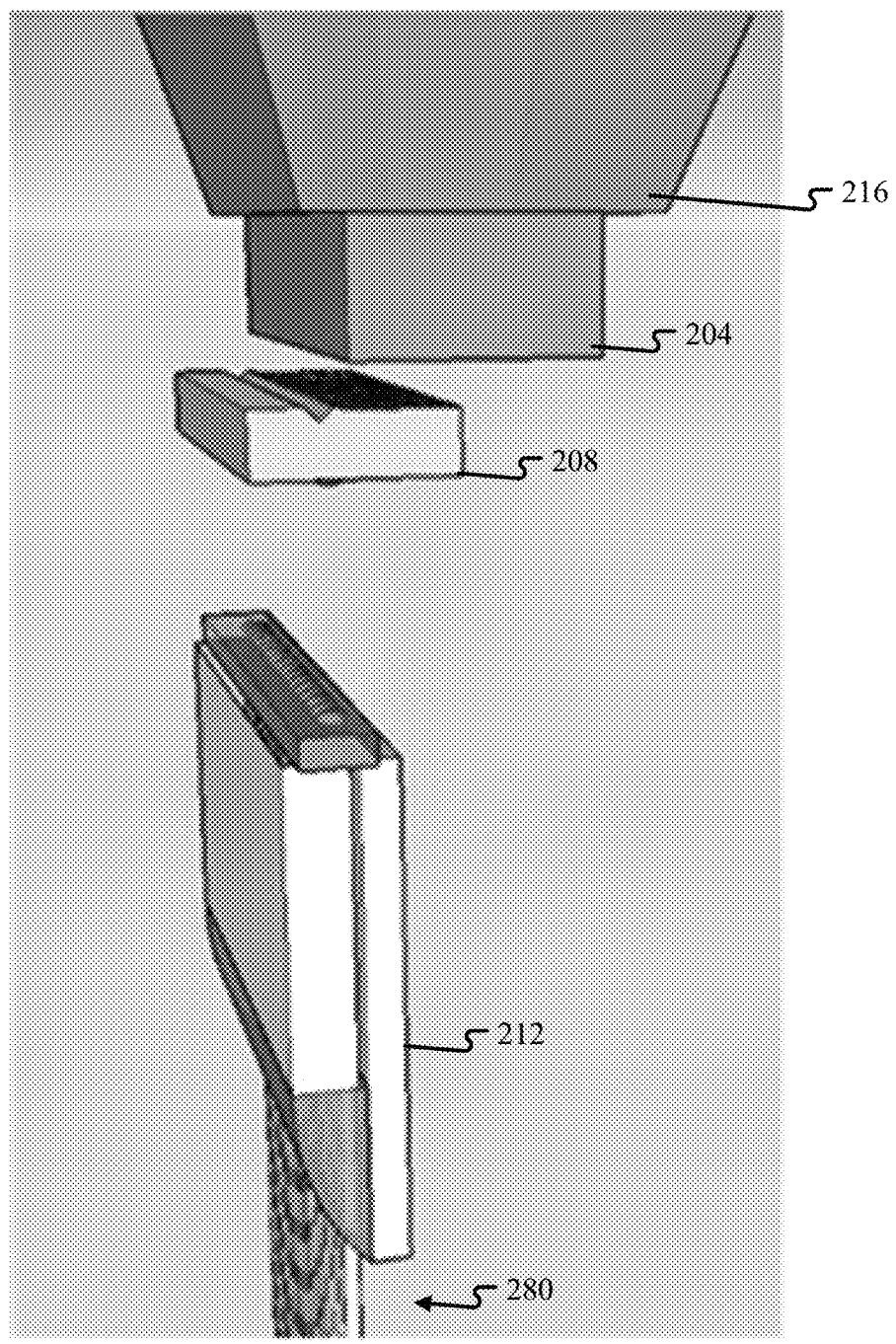
FIGS. 6A, 6B, and 6C illustrate various views of the system in FIG. 2 according to at least one example embodiment.
Figure 6B:
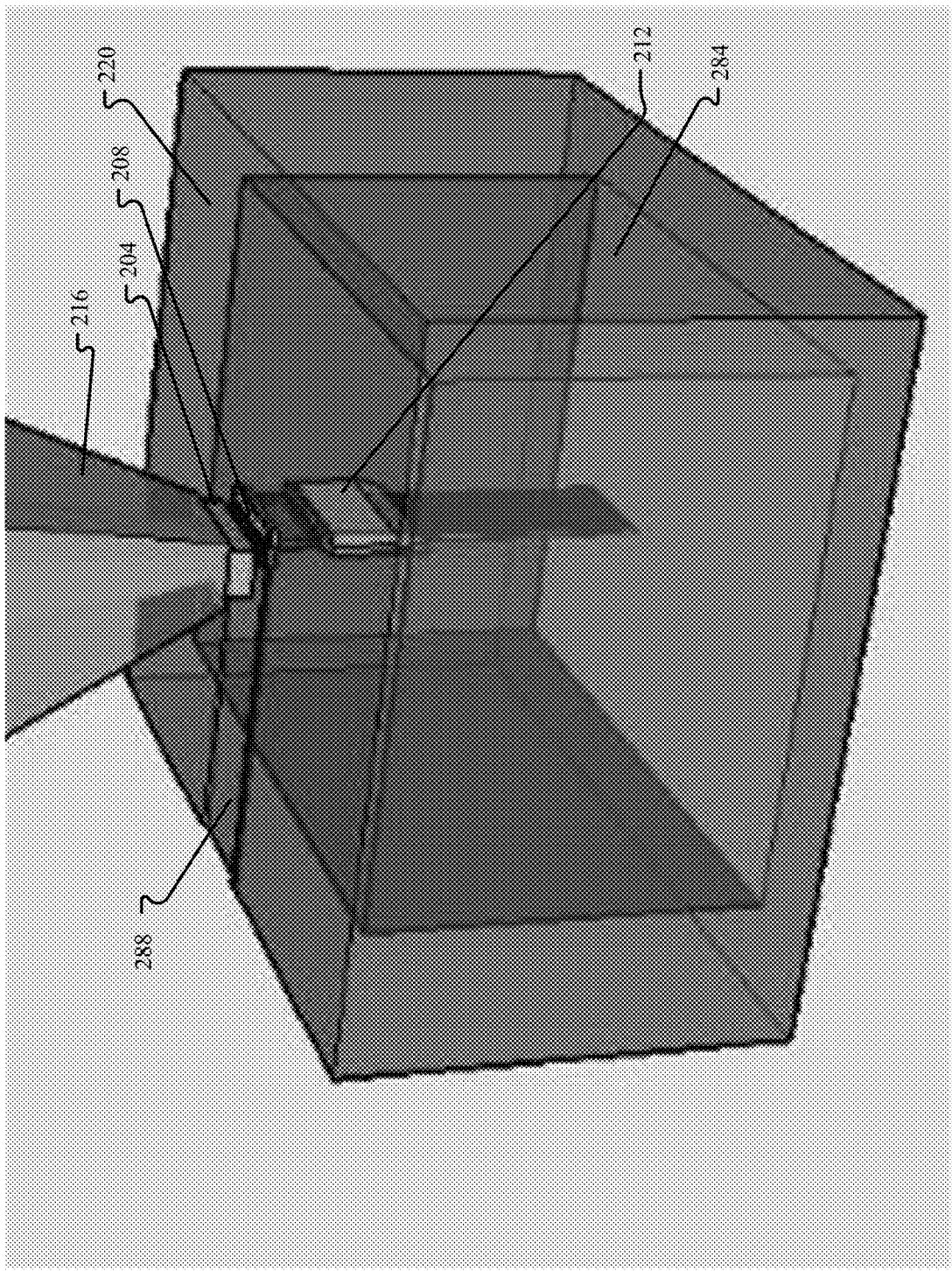
Figure 6C:
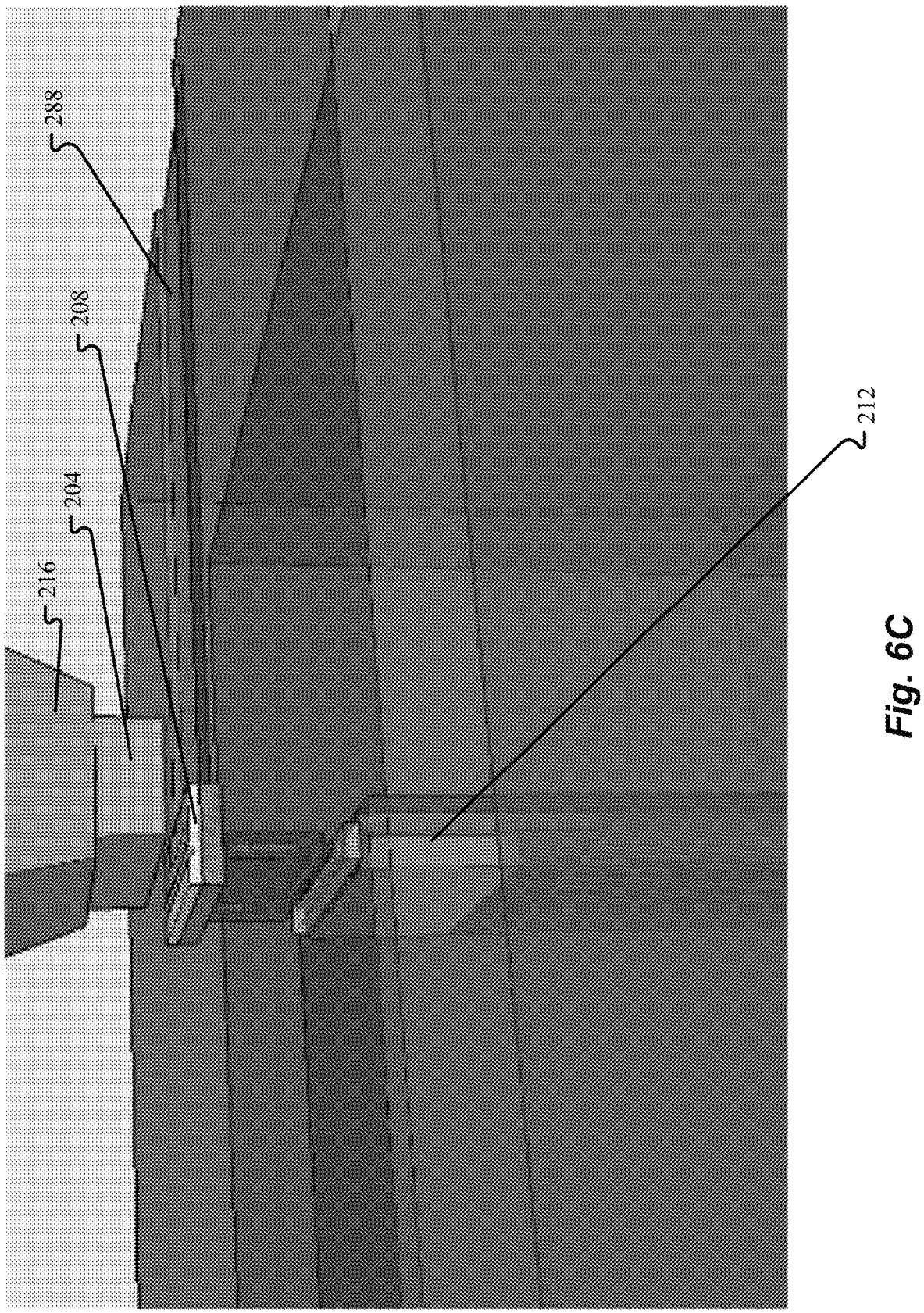

FIGS. 6A, 6B, and 6C illustrate various views of the system 200 according to at least one example embodiment. As shown in FIG. 6A, for example, the mechanism 216 holds the chip 204 with the holding device 230 while the collimators 208 and 212 are held in place by the support structure 220. FIGS. 6B and 6C illustrate an example support structure 220. The support structure 220 in FIGS. 6B and 6C includes a cavity 284 in which the collimator 212 resides. The collimator 212 may be fixed in place within the cavity 284 by any suitable mechanical connection. The collimator 208 and the collimator 212 are at least temporarily fixed to the support structure 220 while the mechanism 216 moves the chip 204. For example, the collimator 212 may be permanently fixed within the support structure 220 or may be removable to enable maintenance. The support structure 220 further includes a recessed portion 288 fitted for the collimator 208 to hold the collimator 208 in place above the collimator 212 while the mechanism 216 moves the chip 204. Additionally or alternatively, the support structure 220 includes a clamp or other suitable device for holding the collimator 208 in place on the surface of the support structure 220.

Here, it should be appreciated that example embodiments have been shown and described with respect to a scenario where the mechanism 216 holds and moves the chip 204 relative to the collimators 208 and 212 fixed on the support structure 220. However, inventive concepts are not limited thereto. In at least one example embodiment, roles of the collimators 208 and 212 and the chip 204 may be reversed such that the collimators 208 and 212 are releasably attached to the mechanism 216 and the chip 204 is held in place. For example, the mechanism 216 would hold and move the support structure 220 including the collimators 208 and 212 (where the support structure 220 may also include the source 224 and the detector 228) relative to the chip 204 fixed on its own support structure. Still further, in at least one example embodiment, the chip 204 and the collimator 212 may be held in place while the mechanism 216 moves the collimator 208 into alignment with the chip 204.

Figure 7:
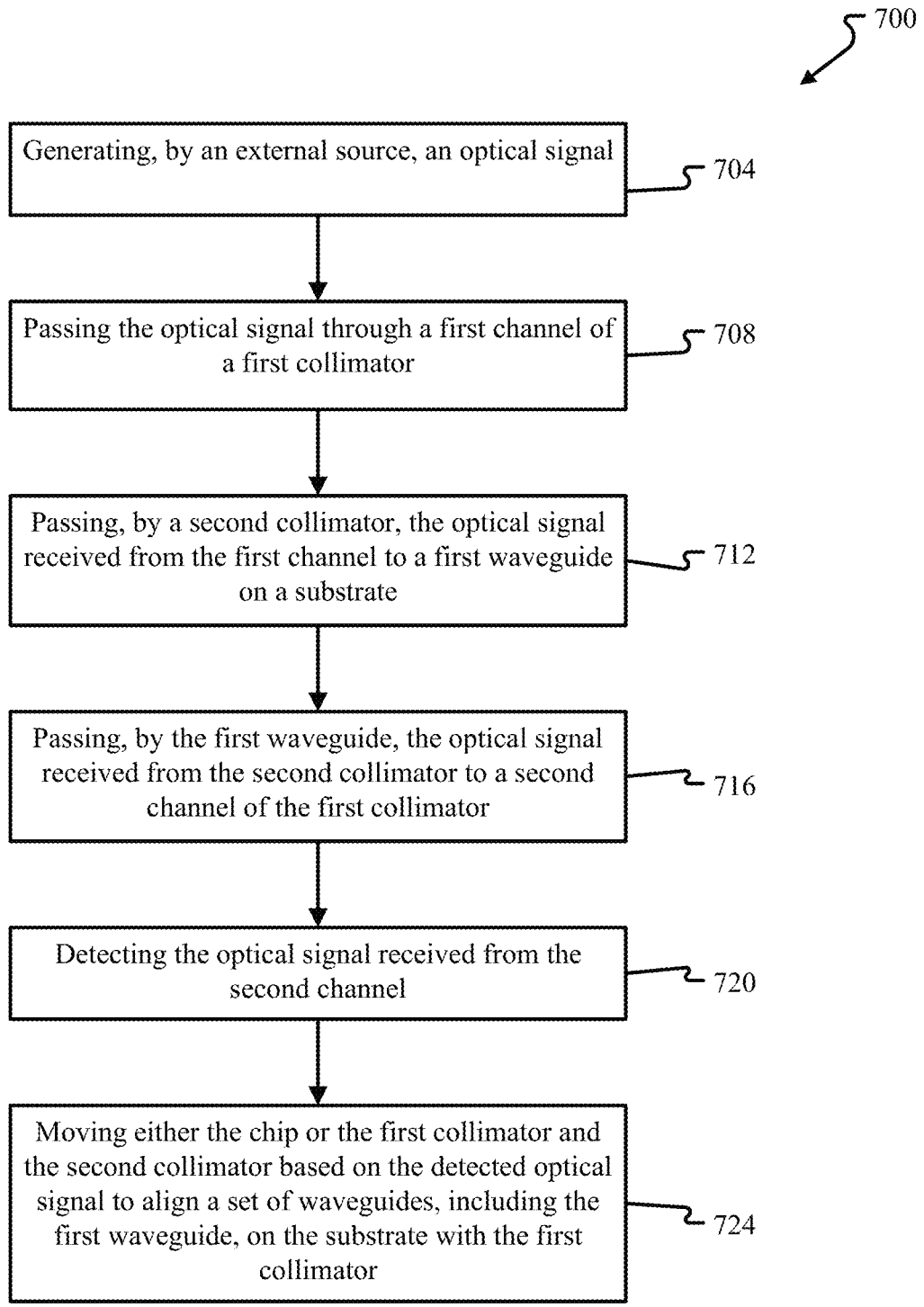
FIG. 7 illustrates a method according to at least one example embodiment.

FIG. 7 illustrates a method 700 according to at least one example embodiment. The method 700 may be performed by various elements from FIGS. 1-6C and be carried out during an alignment stage or process for aligning collimator 208 and chip 204.

Operation 704 includes generating, by an external source, an optical signal. For example, the source 224, which may include a diode laser (e.g., diode laser 124) or other light source, generates the optical signal.

Operation 708 includes passing the optical signal through a first channel CH1 of a first collimator 212. As noted above, the first channel CH1 includes a waveguide 280. The optical signal may be passed by the first channel CH1 to a second collimator 208 through respective lenses of the collimators 212 and 208.

Operation 712 includes passing, by the second collimator 208, the optical signal received from the first channel CH1 to a first waveguide on a chip 204. The first waveguide may correspond to the alignment waveguide 206 on chip 204 that receives the optical signal from the first channel CH1 via a first end E1 of the alignment waveguide 206.

Operation 716 includes passing, by the first waveguide, the optical signal received from the second collimator 208 to a second channel CH2 of the first collimator 212. For example, the optical signal passes out of a second end E2 of the alignment waveguide 206 and through respective lenses of the collimators 208 and 212.

Operation 720 includes detecting the optical signal received from the second channel CH2. For example, the detector 228 detects the optical signal from the second channel CH2 and measures at least one property of the detected light.

Operation 724 includes moving either the chip or the first collimator 212 and the second collimator 208 based on the detected optical signal to align a set of waveguides 248, including the first waveguide, on the chip 204 with the second collimator 208. For example, processing circuitry within the detector 228 or processing circuitry 246 measures the at least one property of detected light and controls the mechanism 216 to bring the second collimator 208 and the chip 204 into alignment. Subsequent to sufficient alignment, the chip 204 and the second collimator 208 are adhered to one another to form an assembled optical device. The assembled optical device is then ready for installment into another device (e.g., device 104) that enables data transmission/reception through the waveguides 248 and collimator 208.

In at least one example embodiment, the alignment between the chip 204 and the collimator 208 may be confirmed by activating additional channels on the collimators 208 and 212. For example, to the extent that the chip 204 includes detectors or light sources optically coupled to waveguides 248, then those detectors may detect light from corresponding active channels of the collimator 212 or those light sources may emit light to corresponding detectors coupled to corresponding channels of the collimator 212. The light from these additional channels detected at the detectors of the chip 204 or at the detectors of the collimator 212 may be analyzed in the same or similar manner as that described above where at least one property of detected light is measured or monitored to assess the quality of alignment between the chip 204 and the collimator 208.

In view of the foregoing, it should be appreciated that inventive concepts relate to, among other things, an optical alignment process and optical device formed according to the alignment process. The alignment process between a collimator and a chip may be performed without activating any of the light producing or light detecting components on the chip. The alignment process may achieve an alignment within 0.1 um accuracy, thereby improving efficiency of data transmission during a data transmission stage.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

Example embodiments may be configured according to the following:

(1) An optical device, comprising:
  a chip;
  a set of waveguides on the chip and configured to carry first optical signals modulated with data during a data transmission stage; and
  an alignment waveguide on the chip and configured to:
  receive a second optical signal during an alignment stage that aligns the set of waveguides with a collimator including a set of lenses; and
  output the second optical signal from the chip, wherein the second optical signal output from the chip is indicative of a quality of alignment between the set of waveguides and the collimator.
(2) The optical device of (1), wherein the second optical signal is generated by a source external to the chip and the collimator.
(3) The optical device of one or more of (1) to (2), further comprising:
  the collimator including the set of lenses, the collimator further including:
    a first lens configured to pass the second optical signal to a first end of the alignment waveguide; and
    a second lens configured to pass the second optical signal output from a second end of the alignment waveguide.
(4) The optical device of one or more of (1) to (3), wherein the collimator includes at least one optical element configured to reflect the first optical signals at a location between the set of lenses and the set of waveguides, and to reflect the second optical signal at a location between the first and second lenses and the first and second ends of the alignment waveguide.
(5) The optical device of one or more of (1) to (4), wherein a surface of the collimator includes a groove with an exposed outer wall and a concealed inner wall, and wherein the at least one optical element is on the inner wall of the groove.
(6) The optical device of one or more of (1) to (5), wherein the groove extends from a first edge of the collimator to a second edge of the collimator.
(7) The optical device of one or more of (1) to (6), wherein the collimator includes a step portion having a face comprised of a transparent material that passes light between the chip and the collimator.
(8) The optical device of one or more of (1) to (7), wherein, in a plan view, at least some of the input/output ends of the set of waveguides are arranged between a first end of the alignment waveguide and a second end of the alignment waveguide.
(9) The optical device of one or more of (1) to (8), wherein the alignment waveguide forms a substantially U-shape on the chip.
(10) The optical device of one or more of (1) to (9), wherein, in a plan view, a first end of the alignment waveguide and a second end of the alignment waveguide are closer to respective opposite edges of the chip than the majority of the set of waveguides.
(11) A system, comprising:
  a chip including a set of waveguides and an alignment waveguide;
  a first collimator including:
    a set of lenses configured to pass first optical signals to or from the set of waveguides;
    a first lens configured to pass a second optical signal to a first end of the alignment waveguide; and
    a second lens configured to pass the second optical signal received from a second end of the alignment waveguide;
  a second collimator including:
    a first channel configured to pass the second optical signal to the first end of the alignment waveguide through the first lens of the first collimator; and
    a second channel configured to pass light received through the second lens of the first collimator to a detector; and
  a mechanism configured to move either the chip or the first collimator and the second collimator to substantially align central axes of the set of waveguides with optical axes of the set of lenses based on light detected by the detector.
(12) The system of (11), further comprising:
  a support structure, wherein the first collimator and the second collimator are at least temporarily fixed to the support structure while the mechanism moves the chip or the support structure.
(13) The system of one or more of (11) to (12), wherein the support structure includes a recessed portion configured to hold the first collimator in place over the second collimator.
(14) The system of one or more of (11) to (13), further comprising:
  a light source that generates the second optical signal; and
  the detector that detects the light received through the second channel.
(15) The system of one or more of (11) to (14), wherein the mechanism is capable of translational motion and rotational motion.
(16) The system of one or more of (11) to (15), wherein the first collimator includes a step portion that creates a wall between a first portion of the first collimator with a first thickness and a second portion of the first collimator with a second thickness less than the first thickness, and wherein the first optical signals and the second optical signals pass through a face of the wall of the step portion.
(17) The system of one or more of (11) to (16), wherein the first collimator includes a groove with an exposed outer wall and a concealed inner wall, and wherein the first collimator includes at least one optical element on the inner wall of the groove configured to reflect the first optical signals received through the face of the wall from the set of waveguides toward the set of lenses, and to reflect the first optical signals received from the set of lenses toward the set of waveguides through the face of the wall, and wherein the at least one optical element is configured to reflect the second optical received through the first lens toward the first end of the alignment waveguide through the face of the wall, and to reflect the second optical signal received from the second end of the alignment waveguide through the face of the wall toward the second lens.

(18) The system of one or more of (11) to (17), wherein at least one of the chip and the first collimator includes one or more alignment marks to assist with bringing the chip and the first collimator into coarse alignment with one another.

(19) The system of one or more of (11) to (18), wherein the mechanism configured to move the chip is further configured to monitor at least one property of the light detected by the detector, and to move the chip to maximize the at least one property of the light detected by the detector.

(20) A method, comprising:
generating, by an external source, an optical signal;
passing the optical signal through a first channel of a first collimator;
passing, by a second collimator, the optical signal received from the first channel to a first waveguide on a chip;
passing, by the first waveguide, the optical signal received from the second collimator to a second channel of the first collimator;
detecting the optical signal received from the second channel; and
moving either the chip or the first collimator and the second collimator based on the detected optical signal to align a set of waveguides, including the first waveguide, on the chip with the second collimator.

What is claimed is:

1. An optical device, comprising:
a chip;
a set of waveguides on the chip and configured to carry first optical signals modulated with data during a data transmission stage; and
an alignment waveguide on the chip and configured to:
receive a second optical signal during an alignment stage that aligns the set of waveguides with a collimator including a set of lenses; and
output the second optical signal from the chip, wherein the second optical signal output from the chip is indicative of a quality of alignment between the set of waveguides and the collimator.

2. The optical device of claim 1, wherein the second optical signal is generated by a source external to the chip and the collimator.

3. The optical device of claim 1, further comprising:
the collimator including the set of lenses, the collimator further including:
a first lens configured to pass the second optical signal to a first end of the alignment waveguide; and
a second lens configured to pass the second optical signal output from a second end of the alignment waveguide.

4. The optical device of claim 3, wherein the collimator includes at least one optical element configured to reflect the first optical signals at a location between the set of lenses and the set of waveguides, and to reflect the second optical signal at a location between the first and second lenses and the first and second ends of the alignment waveguide.

5. The optical device of claim 4, wherein a surface of the collimator includes a groove with an exposed outer wall and a concealed inner wall, and wherein the at least one optical element is on the inner wall of the groove.

6. The optical device of claim 5, wherein the groove extends from a first edge of the collimator to a second edge of the collimator.

7. The optical device of claim 3, wherein the collimator includes a step portion having a face comprised of a transparent material that passes light between the chip and the collimator.

8. The optical device of claim 1, wherein, in a plan view, at least some input/output ends of the set of waveguides are arranged between a first end of the alignment waveguide and a second end of the alignment waveguide.

9. The optical device of claim 8, wherein the alignment waveguide forms a substantially U-shape on the chip.

10. The optical device of claim 1, wherein, in a plan view, a first end of the alignment waveguide and a second end of the alignment waveguide are closer to respective opposite edges of the chip than a majority of the set of waveguides.

11. A system, comprising:
a chip including a set of waveguides and an alignment waveguide;
a first collimator including:
a set of lenses configured to pass first optical signals to or from the set of waveguides;
a first lens configured to pass a second optical signal to a first end of the alignment waveguide; and
a second lens configured to pass the second optical signal received from a second end of the alignment waveguide;
a second collimator including:
a first channel configured to pass the second optical signal to the first end of the alignment waveguide through the first lens of the first collimator; and
a second channel configured to pass light received through the second lens of the first collimator to a detector; and
a mechanism configured to move either the chip or the first collimator and the second collimator to substantially align central axes of the set of waveguides with optical axes of the set of lenses based on light detected by the detector.

12. The system of claim 11, further comprising:
a support structure, wherein the first collimator and the second collimator are at least temporarily fixed to the support structure while the mechanism moves either the chip or the support structure.

13. The system of claim 12, wherein the support structure includes a recessed portion configured to hold the first collimator in place over the second collimator.

14. The system of claim 11, further comprising:
a light source that generates the second optical signal; and
the detector that detects the light received through the second channel.

15. The system of claim 11, wherein the mechanism is capable of translational motion and rotational motion.

16. The system of claim 11, wherein the first collimator includes a step portion that creates a wall between a first portion of the first collimator with a first thickness and a second portion of the first collimator with a second thickness less than the first thickness, and wherein the first optical signals and the second optical signals pass through a face of the wall of the step portion.

17. The system of claim 16, wherein the first collimator includes a groove with an exposed outer wall and a concealed inner wall, and wherein the first collimator includes at least one optical element on the inner wall of the groove configured to reflect the first optical signals received through the face of the wall from the set of waveguides toward the set of lenses, and to reflect the first optical signals received from the set of lenses toward the set of waveguides through the face of the wall, and wherein the at least one optical element is configured to reflect the second optical received through the first lens toward the first end of the alignment waveguide through the face of the wall, and to reflect the second optical signal received from the second end of the alignment waveguide through the face of the wall toward the second lens.

18. The system of claim 11, wherein at least one of the chip and the first collimator includes one or more alignment marks to assist with bringing the chip and the first collimator into coarse alignment with one another.

19. The system of claim 11, wherein the mechanism configured to move the chip is further configured to monitor at least one property of the light detected by the detector, and to move the chip to maximize the at least one property of the light detected by the detector.

20. A method, comprising:
   generating, by an external source, an optical signal;
   passing the optical signal through a first channel of a first collimator;
   passing, by a second collimator, the optical signal received from the first channel to a first waveguide on a chip;
   passing, by the first waveguide, the optical signal received from the second collimator to a second channel of the first collimator;
   detecting the optical signal received from the second channel; and
   moving either the chip or the first collimator and the second collimator based on the detected optical signal to align a set of waveguides, including the first waveguide, on the chip with the second collimator.

* * * * *